United States Patent [19]

Koda et al.

[11] Patent Number: 5,146,062
[45] Date of Patent: Sep. 8, 1992

[54] FEEDING DEVICE FOR A WELDING BOLT

[75] Inventors: Nobuji Koda, Kasugai; Yasuhiro Kanaishi, Iwakura; Yokichi Samizo, Nagoya, all of Japan

[73] Assignee: Yajima Kogyo, Inc., Nagoya, Japan

[21] Appl. No.: 504,228

[22] Filed: Apr. 4, 1990

[30] Foreign Application Priority Data

Apr. 26, 1989 [JP] Japan ................... 1-049460[U]

[51] Int. Cl.$^5$ ................... B23K 9/28; B23K 11/00
[52] U.S. Cl. ........................................... 219/93
[58] Field of Search .................. 219/93, 91.2, 91.22, 219/92

[56] References Cited

FOREIGN PATENT DOCUMENTS 59-5510 2/1984 Japan .
59-127975 7/1984 Japan .
60-54832 12/1985 Japan .

*Primary Examiner*—Marvin M. Lateef
*Attorney, Agent, or Firm*—Armstrong, Nikaido, Marmelstein, Kubovcik and Murray

[57] ABSTRACT

A bolt feed device for feeding a welding bolt to a welding section of a welder is installed separately from an electrode. The device includes a feed device body holding an end portion of a welding bolt feed pipe; a feed rod installed for movement forward or rearward relative to the feed device body; a bolt grasping section having a bolt receptacle and installed to the feed rod so that when the feed rod is at a retreat position the bolt receptacle is positioned at a lower end portion of the feed pipe, and when it is at an advance position the bolt receptacle is positioned at the welding section; and an inserting device having a welding bolt inserting cylinder and installed to the feed rod so that when the feed rod is at the retreat position the welding bolt inserting cylinder is positioned at a lateral side of the feed pipe, and when it is at the advance position the welding bolt inserting cylinder is rotated and positioned onto the bolt receptacle of the bolt grasping section.

4 Claims, 5 Drawing Sheets

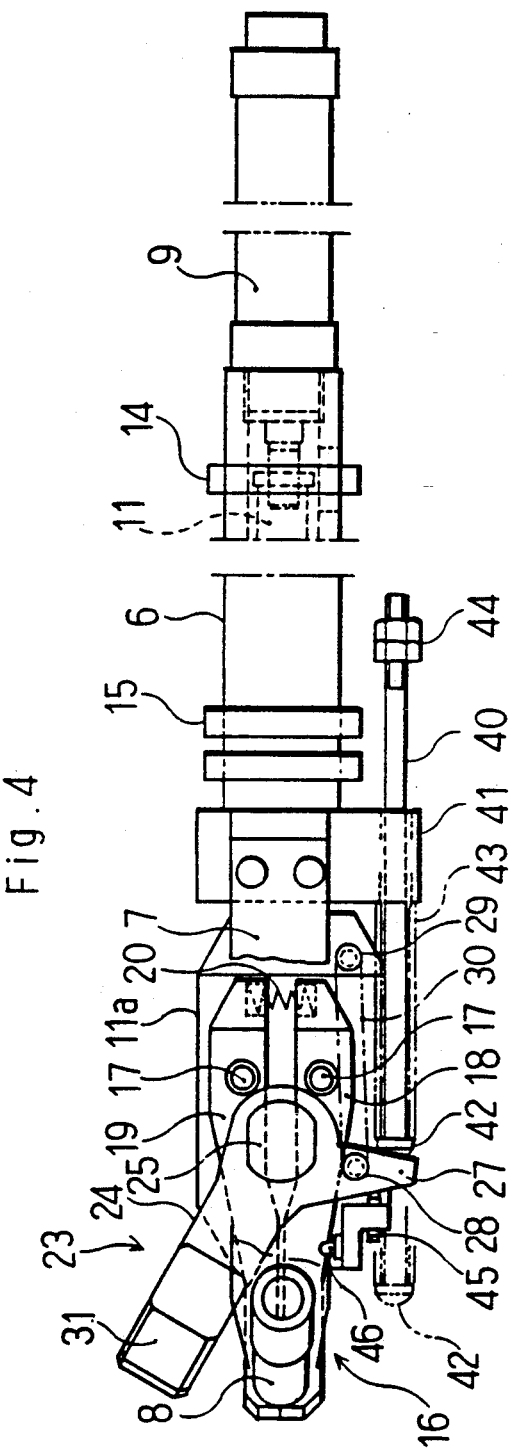

FEEDING DEVICE FOR A WELDING BOLT

BACKGROUND OF THE INVENTION

(1) Field of the Invention

The present invention relates to a device for feeding a welding bolt wherein the welding bolt to be welded to a sheet metal member is automatically supplied to a welding section formed between electrodes of a welder.

(2) Description of the Prior Art

In the prior art, in order that a welding bolt is welded by projection welding to a sheet member formed from a steel sheet (hereinafter referred to as "work"), a resistance welder (hereinafter abbreviated as "welder") is used. This welding method is generally performed in that a work is positioned and held onto a lower electrode of a welder and a welding bolt is inserted in a welding hole of the work and then electric power is supplied thereto under pressure by an upper electrode.

In this case, a guide hole having a larger diameter than the axial diameter of the welding bolt is bored on the lower electrode, and a guide pin movable forward or rearward by means of a spring or fluid pressure is inserted in the guide hole. The work is positioned either in a method where the work is fixed to a jig or the like attached to the welder and the welding hole corresponding to this is aligned with the axial center of the lower electrode or in a method where the welding hole of the work is fitted to the guide pin of the lower electrode.

Insertion of a welding bolt is performed in that the welding bolt aligned by a parts feeder or the like is transferred onto a lower electrode by a feed device having a grasping mechanism and is inserted by its own weight (refer to Japanese patent publication No. 127975/1984) or in that lowering action for the application of pressure by an upper electrode of the welder is utilized (refer to Japanese utility model application laid-open No. 5510/1984 and Japanese patent publication No. 54832/1985) and the welding bolt is forcedly inserted. In this connection, the feed device for forcedly inserting the welding bolt by the upper electrode exists in that the feed device is constituted integral with the upper electrode of the welder as shown in the Japanese utility model application laid-open No. 5510/1984, or in that the feed device is constituted independently from the upper electrode as shown in the Japanese patent publication No. 54832/1985.

When the welding bolt is inserted by its own weight in the welding hole of the work, however, the accurate insertion cannot be effected unless respective axial centers of the welding hole, the lower electrode and the welding bolt are aligned with each other. It is true that diameter of the welding hole of the work or the guide hole of the lower electrode is bored slightly larger than the axial diameter of the welding bolt, but deviation of the axial center (positioning deviation) must be within the dimension difference. Consequently, the higher positioning accuracy of the work is required. For example, when the positioning is performed using a jig or the like, the mechanism must be highly developed. Moreover, since such a highly developed mechanism or device is made for exclusive use on one work, it cannot be widely used for various sorts of other works and the cost of the equipment increases.

On the other hand in the above-mentioned forced inserting device wherein the feed device is integral with the upper electrode, since the upper electrode penetrates the inside of the feed device, the structure is complicated, and since the impact force is strong while the upper electrode at the bolt holder is lowered, the size becomes large in order to raise the durability of the device. Further during use, since the upper electrode is abraded at the top end plane during welding or the side surface as the bolt holder penetrates, repair or exchange of the device is frequently required. However, since the upper electrode exists in the inside of the feed device, such working becomes difficult. In addition to such problems in the mechanism, the insulation processing to prevent shorting of current during the conduction welding, the means for preventing the magnetization generated in this time and the like make the structure more complicated and of larger diameter.

Also in the apparatus where the feed device is independent from the upper electrode, although the complicated structure can be avoided, the anti-impact property to the upper electrode is small and the device as a whole is subject to deflection or vibration, whereby the direction in which the welding bolts are pushed out becomes unstable and the welding bolts may be misaligned for proper insertion in the hole. In this case, if the lowering speed of the upper electrode is decreased, the impact is reduced but the productivity of the welding deteriorates and many other problems occur.

SUMMARY OF THE INVENTION

The invention is a feeding device for a welding bolt in a welder wherein the welding bolt is fed to a welding section formed by a pair of opposed and separable electrodes, comprising a feed device body disposed to the lateral side of the welding section for holding an end portion of a welding bolt feed pipe; a feed rod installed to be movable forward or rearward relative to the feed device body; a bolt grasping section having a bolt receptacle and installed to the feed rod for positioning the bolt receptacle corresponding to advance or retreat of the feed rod, so that when the feed rod is at the retreat position the bolt receptacle is positioned adjacent a lower side of the end portion of the feed pipe, and when it is at the advance position the bolt receptacle is positioned at the welding section; and an inserting device having a welding bolt inserting cylinder and mounted to the feed rod for positioning the welding bolt inserting cylinder corresponding to the advance or retreat movement of the feed rod, so that when the feed rod is at the retreat position the welding bolt inserting cylinder is positioned at a lateral side of the feed pipe, and when it is at the advance position the welding bolt inserting cylinder is positioned on the bolt receptacle of the bolt grasping section.

A main object of the invention is to provide a feeding device for a welding bolt, wherein the welding bolt can be inserted into a welding hole rapidly and securely in a simple constitution.

Another object of the invention is to provide a feeding device for a welding bolt, wherein an inserting device for inserting the welding bolt to a work is separately installed, thereby impact of an electrode is reduced in comparison to a forced inserting method by the electrode. Consequently abrasion of the electrode and the like are not produced and also deflection, vibration and the like of the device as a whole are not produced.

Still another object of the invention is to provide a feeding device for a welding bolt, wherein a pushing-out direction of the welding bolt is always stable, there is no insertion miss, and the insertion can be performed securely by an inserting cylinder, even if the inserting direction is varied, it can be easily accommodated. Moreover, since the inserting cylinder may have force enough to push the welding bolt only and therefore be miniaturized, as a result the mechanism for delivery, conveyance, insertion of the welding bolt can be compactly assembled and therefore can be separated from the position of the electrode of the welder to enlarge the working region. Further, since the lowering movement speed of the electrode need not be decreased the productivity of the welding can be maintained well.

BRIEF DESCRIPTION OF THE DRAWINGS

FIG. 4 is a partial cutaway plan view of the bolt feeding device;

FIG. 5 is a plan view of an inserting device in the bolt feeding device at the advance position;

DESCRIPTION OF THE PREFERRED EMBODIMENT

Figure 1:
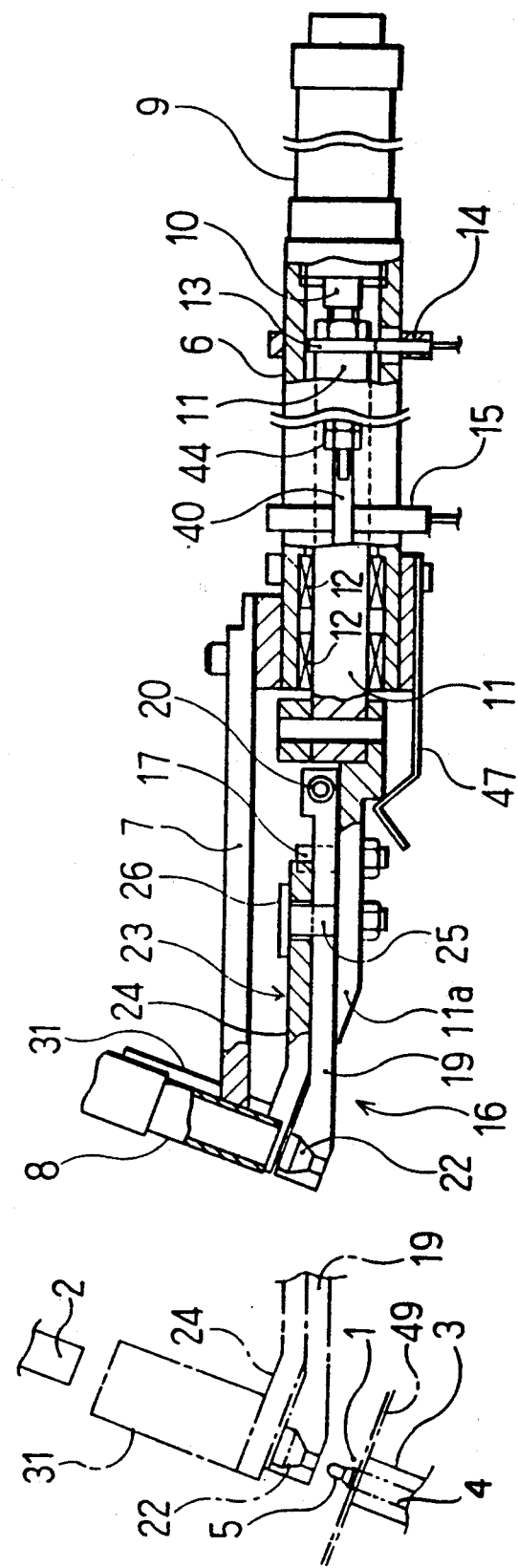
FIG. 1 is a partial cutaway side elevation of a bolt feeding device of the invention.
Figure 2:
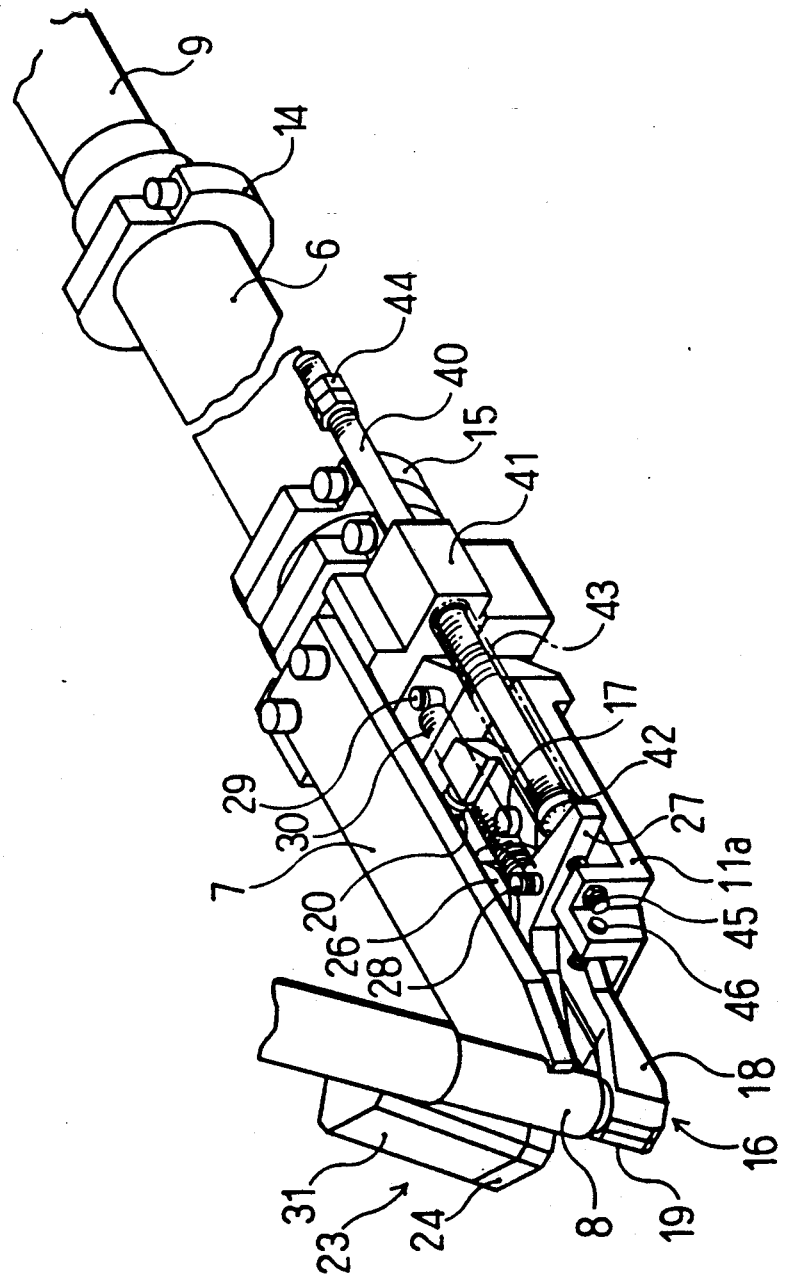
FIG. 2 is a partial cutaway perspective view of the bolt feeding device with a bolt inserting device at the retreat position.
Figure 3:
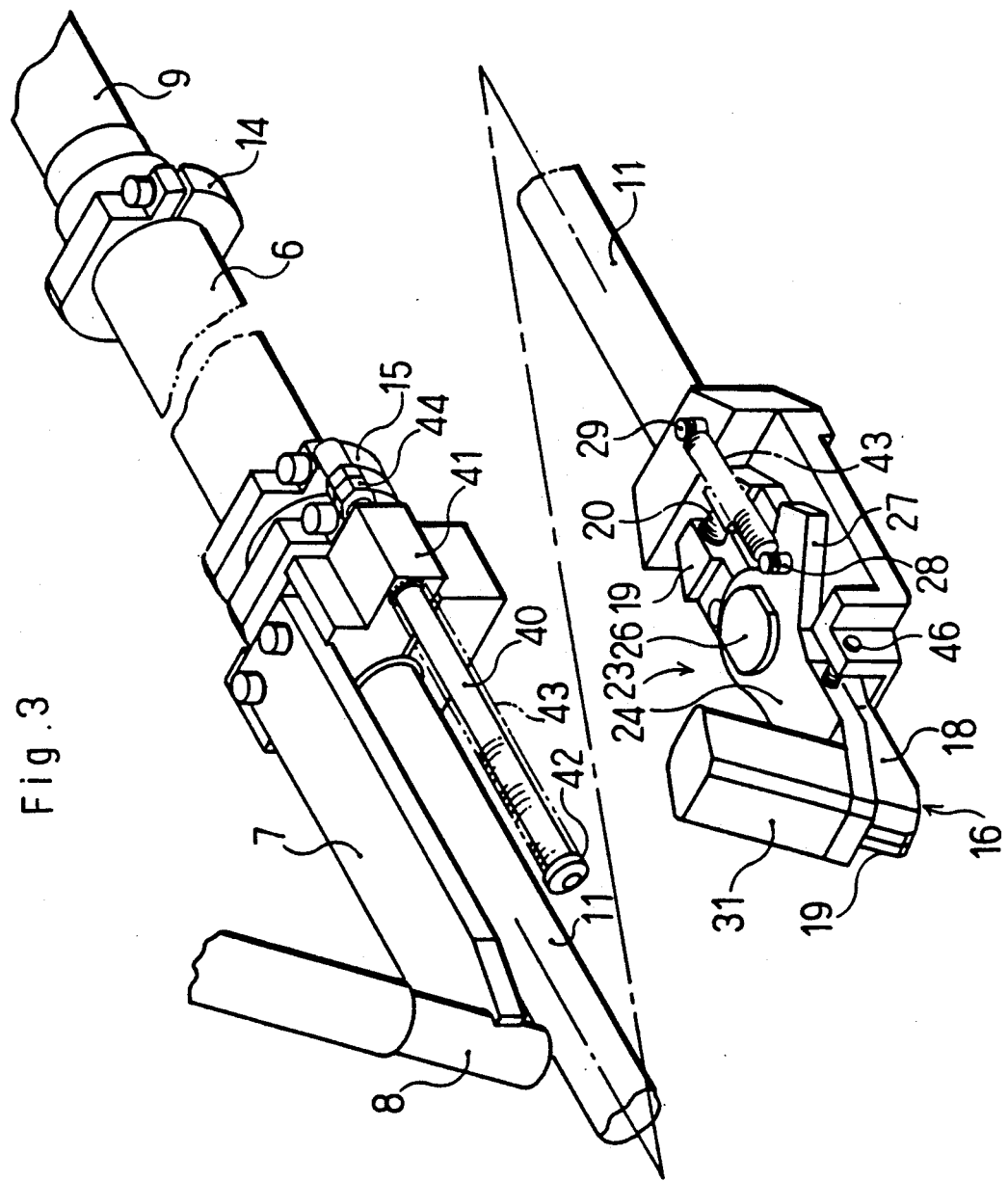
FIG. 3 is a partial cutaway perspective view of the bolt feeding device with a bolt inserting device to the advance position.

With reference to FIG. 1, a welding section 1 is formed between a pair of opposed and separable electrodes 2 and 3. A guide hole 4 is bored at the center of the lower electrode 3, and a guide pin 5 mounted for forward or rearward movement by a spring or a fluid pressure means (not shown) is inserted in the guide hole 4.

A welding bolt feed device body 6 is arranged to the lateral side of the welding section 1, and is constituted by a cylindrical body having a fluid pressure cylinder 9 operated at one end.

A holder 7 for holding an end portion of a welding bolt feed pipe 8 is installed at the top side of the welding bolt feed device body 6. The welding bolt feed pipe 8 is connected to a parts feeder (not shown) by a flexible feeding hose.

A welding bolt feed rod 11 is mounted on the top side of the piston rod 10 of the feed device body 6. The welding bolt feed rod 11 is pivotally supported to bearings 12, 12 internally installed to the feed device body 6, and the top end of the welding bolt feed rod 11 is projected from the feed device body 6 and is movable forward or rearward by operation of the cylinder 9. A detector 13 is fixed to one end of the welding bolt feed rod 11, and is operated corresponding to a retreat confirming sensor 14 and an advance confirming sensor 15 installed in spaced relation on the feed device body 6 so as to define the retreat position and the advance position of the feed rod 11 respectively. In order to prevent the rotation of the feed rod 11, a turning stopper (not shown) is provided at a suitable position within the feed device body 6.

Figure 6:
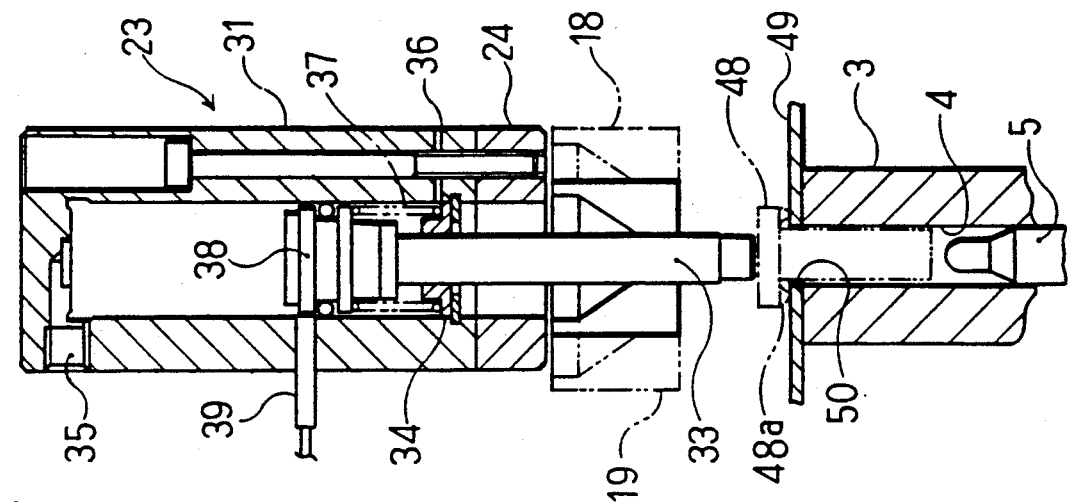
FIG. 6 is an enlarged sectional view of an inserting device in the bolt feeding device before inserting the welding bolt.
Figure 7:
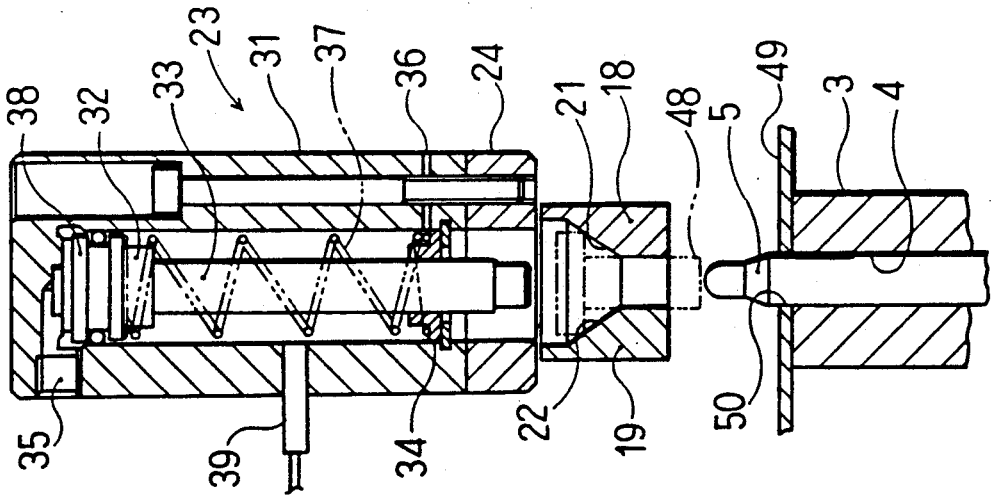
FIG. 7 is an enlarged sectional view of the inserting device in the bolt feeding device after inserting the welding bolt.

A bolt grasping section 16 for grasping or releasing a welding bolt is installed at the top side of the welding bolt feed rod 11 through a plate-shaped extending portion 11a. The bolt grasping section 16 as shown in FIG. 4 is constituted by symmetrical grasping bodies 18, 19 supported in rockable or pivotal manner on the extending portion 11a by rotary pins 17, 17, and a compression spring (first spring means) 20 is interposed between basic ends of the grasping bodies 18, 19 and the top ends of the grasping bodies 18, 19 are rotated to face each other normally about the rotary pins 17, 17 by the spring force of the compression spring 20 so that the top ends of the grasping bodies 18, 19 are normally closed. Bolt receptacles 21, 22 of half-split concave shape capable of receiving the welding bolt are formed at the top end side of the grasping bodies 18, 19 respectively as shown by FIGS. 6 and 7. The bolt receptacles 21, 22 are disposed to a lower side of the end of the feed pipe 8 at the retreat position where the feed rod 11 is stopped based on retreat signal of the retreat confirming sensor 14 (refer to the solid line position of FIG. 1) so that the welding bolt delivered in the feed pipe 8 can be received. On the other hand, the bolt receptacles 21, 22 are disposed to the welding section 1 at the advance position where the feed rod 11 is stopped based on advance detecting signal of the advance confirming sensor 15 (refer to the dash-and-dot line of FIG. 1) so that the welding bolt held by the receptacles 21, 22 can be depressed to the work as shown by FIGS. 6 and 7.

An inserting device 23 of the welding bolt 23 is further installed to the extending portion 11a. The inserting device 23 has a holding arm 24 pivotally supported or rockable to a fixing shaft 25 stood upstanding on the extending portion 11a, and its lower surface is slidable on the grasping bodies 18, 19 and its upper surface is pushed weakly by a collar 26 at an upper end of the fixing bolt 25. As shown in FIG. 4, a locking arm 27 projects and wound at the side of the fixing shaft 25 of the holding arm 24, and a tension spring (second spring means) 30 is installed between a spring receptacle 28 provided at the locking arm 27 and a spring receptacle 29 of the extending portion 11a. The holding arm 24 is normally supplied with a rotational force in the counterclockwise direction by the spring 30. An inserting cylinder 31 is mounted at the top end of the holding arm 24, and is constituted as shown in FIGS. 6 and 7 that a piston rod 33 of a piston 32 is guided by a rod ring 34 at a lower side and movable up and down. Numeral 35 designates an inlet port of pressure fluid, numeral 36 designates an outlet port thereof, and numeral 37 designates a return spring for resetting the piston rod. Further, a detecting section 38 is installed to the piston 32, and acts interlocking with a sensor 39 installed on a cylinder wall of the inserting cylinder 31 and performs confirmation of the lowering position of the piston rod 33, that is, confirms whether the welding bolt is inserted correctly to the welding position of the work or not.

A bracket 41 installed to the feed device body 6 is provided with an escape bar 40 slidably supported with respect to the bracket. A compression spring (third spring means) 43 is interposed between a collar 42 at one end of the escape bar 40 and the bracket 41, an also a stopper 44 is mounted at a second rear end. The escape bar 40 holds the collar 42 to the abutting state on the side surface of the locking arm 27 when the feed rod 11 is at the retreat position s shown in FIG. 4, and the inserting cylinder 31 on the holding arm 24 is rotated and positioned to the lateral side of the feed pipe 8 remote from the upper side of the bolt receptacles 21, 22, i.e., to a turnout position where the inserting cylinder 31 does not collide or interfere with the feed pipe 8. Therefore the spring force of the compression spring 43 is set larger than that of the tension spring 30. Consequently, when the feed rod 11 advances and also the side of the locking arm 27 advances, this is accompanied by the following advancing of the escape bar 40 due to the spring force of the compression spring 43. However, if the stopper 44 abuts on the end surface of the bracket 41 at the midway of the advancing, the escape bar 40 is stopped and the rotational force in the clockwise direction to the holding arm 24 is then stopped. As a result, the holding arm 24 begins to rotate in the counterclockwise direction about the fixing shaft 25 due to the action of the tension spring 30, and at the position where the inserting cylinder 31 goes beyond the feed pipe 8, the center of the inserting cylinder 31 is positioned on the center of the bolt receptacles 21, 22 as shown by FIG. 5.

In FIG. 5, a stopper 45 for adjusting the turnout angle of the holding arm 24 is shown installed at the extending portion 11a, and a stopper 46 for adjusting the insertion of the inserting cylinder 31 is also shown installed at the extending portion 11a and both stoppers 45, 46 can be adjusted in length. In FIG. 1, numeral 47 designates a safety spring for preventing projection of the feed rod 11. In FIGS. 1, 6 and 7, 48 designates a welding bolt, numeral 48a designates a projecting portion formed at lower surface of the head of the welding bolt 48, numeral 49 designates a work, and numeral 50 designates a welding hole of the work 49.

Next, operation of the embodiment will be described.

First, as shown in FIG. 6, the welding hole 50 of the work 49 is fitted to the guide pin 5 of the lower electrode 3 and the positioning of the work 49 is performed. Then the bolt grasping section 16 of the feed device grasps one welding bolt 48 at the waiting state, and the inserting cylinder 31 of the inserting device 23 is locked to the escape bar 40 at the turnout position.

Subsequently, when welding is to be started, the cylinder 9 is operated and the feed rod 11 advances through the piston rod 10. The bolt grasping section 16 and the inserting device 23 also advance together with the extending portion 11a. Furthermore, the escape bar 40 pushing the locking arm 27 also advances due to the spring force of the compression spring 43, and as shown in FIG. 4, when the collar 42 attains the dash-and-dot line position, the stopper 44 abuts on the bracket 41 an the escape bar 40 is stopped.

As a result, the pushing force of the escape bar 40 to the locking arm 47 is released and the holding arm 24 is rotated counterclockwise about the fixing shaft 25 by the tension spring 30. When the lateral end surface of the holding arm 24 abuts on the stopper 46, the rotation is stopped. Thus as shown in FIG. 5, the inserting cylinder 31 is positioned on the extension of the feed rod 11, i.e., just above the bolt receptacles 21, 22. The above operation is finished while the bolt grasping section 16 attains to the advance end.

If the bolt grasping section 16 attains to the advance end, the detector 13 operates the advance confirming sensor 15 and operation of the cylinder 9 is stopped by the confirming signal and the advance of the feed device 11 is stopped and the lower end of the welding bolt 48 grasped between the bolt receptacles 21, 22 is positioned above the guide pin 5.

Also the inserting cylinder 31 is operated by the confirming signal, and as shown in FIG. 6, the pressure fluid is fed from the inlet port 35 to lower the piston rod 33 until its end abuts on and depresses the head of the welding bolt 48. Since the depressing force is larger than the spring force of the compression spring 20 between the grasping bodies 18, 19, the head of the welding bolt 48 pushes the closed side open at the top end of the grasping bodies 18, 19 and slides down between the bolt receptacles 21, 22, until the welding bolt 48 is pushed out between the bolt receptacles 21, 22 and its lower end contacts with the upper surface of the guide pin 5. In this case, if the fluid pressure for raising the guide pin 5 is cut, the guide pin 5 together with the welding bolt 48 is lowered. And then the lower end of the welding bolt 48 passes through the welding hole 50 of the work 49 to enter the guide hole 4, and the projecting flange 48a abuts on the surface of the work 49 and is stopped (FIG. 7).

At the same time, the sensor 39 is operated by the detecting section 38 of generates an piston 32 and the insertion finishing signal of the welding bolt 48 to stop feeding the pressure fluid through the inlet port 35 is. The piston rod 33 is reset to its elevated starting position by the return spring 37, and the side of the bolt receptacles 21, 22 of the grasping bodies 18, 19 are also reset to the closed state by the compression spring 20.

The cylinder 9 is also operated in reverse manner and the feed rod 11 retreats. At the midway point the locking arm 27 abuts on the collar 42 of the escape bar 40 and the escape bar 40 also follows the retreating movement. However, since the holding arm 24 is pulled by the tension spring 30 and the spring force of the tension spring 30 is set smaller than that of the compression spring 43, at first, the holding arm 24 is pushed by the escape bar 40 and is rotated clockwise about the fixing shaft 25. This rotation is stopped when the stopper 45 abuts on the side surface of the locking surface of the locking arm 27 and the inserting cylinder 31 is thereby rotated and rest to the retreat position.

When the detector 13 is reset to the position of the retreat confirming sensor 14 by the retreat of the feed rod 11, operation of the cylinder 9 is stopped by the retreat confirming signal and the feed rod 11 is stopped. At the same time, the welder operation is started. The upper electrode 2 is lowered, to abut, apply pressure and conduct current to the head of the welding bolt 48 and finish projection welding of the welding bolt 48 to work 49. Then the welding bolt 48 and the work 49 are moved out of the work by movement of the guide pin 5 the exchange and movement to another welding hole are performed. Further, the parts feeder (not shown) is operated by the retreat confirming signal and another welding bolt is fed to the feed pipe 8 and given a prescribed attitude and fed and grasped between the bolt receptacles 21, 22 of the grasping section 16. The direction of the opposed electrodes is not always limited to the vertical direction, but may be arbitrarily set between 0degrees–180 degrees.

EFFECTS OF THE INVENTION

According to the invention as above described, since the inserting device of the welding bolt to the work is separately installed, impact of the electrode is substantially reduced in comparison to the forced inserting method by the electrode, thereby abrasion of the electrode and the like are not produced and deflection, vibration and the like of the device as a whole are not produced.

Also since the pushing-out direction of the welding bolt is always stable, no misalignment results and the secure insertion can be performed by the inserting cylinder. Even if the inserting direction is varied, it can be easily accommodated. Moreover, the inserting cylinder may have force enough to push in the welding bolt and therefore can be miniaturized. As a result, the mechanism of delivery, conveyance and insertion of the welding bolt can be assembled compactly, consequently separation from the position of the electrode of the welder can be performed and the working area is enlarged. Further, since the lowering speed of the electrode need not be decreased, the productivity of the welding can be maintained well.

What is claimed is:

1. A device for feeding a welding bolt in a welder wherein the welding bolt is fed to a welding section formed by a pair of opposed and separable electrodes, said feeding device comprising:

a feed device body disposed at a lateral side of said welding section for holding an end portion of a welding bolt feed pipe;

a feed rod mounted for forward and rearward movement relative to said feed device body between an advance position and a retreat position;

a bolt grasping section having a bolt receptacle and mounted to said feed rod for positioning the bolt receptacle corresponding to forward and rearward movement of the feed rod, so that when the feed rod is at the retreat position the bolt receptacle is positioned adjacent a lower end portion of said feed pipe, and when the feed rod is at the advance position the bolt receptacle is positioned at said welding section; and an inserting device having a welding bolt inserting cylinder and mounted to said feed rod for positioning the welding bolt inserting cylinder corresponding to forward and rearward movement of the feed rod, so that when the feed rod is at the retreat position the welding bolt inserting cylinder is positioned at a lateral side of said feed pipe, and when the feed rod is at the advance position the welding bolt inserting cylinder is positioned on the bolt receptacle of said bolt grasping section.

2. A device for feeding a welding bolt as set forth in claim 1, said bolt grasping section comprising:

a pair of symmetrical bolt grasping bodies having bolt receptacles in an upper surface thereof;

two rotary pins fixed to a plate-shaped extending portion projecting from an upper surface of said feed rod, each of said respective rotary pins pivotally mounting an intermediate portion of one of said bolt grasping bodies; and a first spring means interposed between ends of said bolt grasping bodies opposite from said bolt receptacles for rotating the bolt grasping bodies so that both bolt grasping bodies pivot about the rotary pins and the bolt receptacles face and abut each other.

3. A device for feeding a welding bolt as set forth in claim 1, said inserting device comprising:

a holding arm having an inserting cylinder mounted to an upper surface thereof;

a fixing shaft projecting upward from a plate extending forward from an upper surface of said feed rod for pivotally supporting a center portion of the holding arm;

a locking arm projected from the holding arm;

a second spring means with one end fixed to the locking arm and another end fixed to the plate respectively;

an escape bar slidably supported by a bracket mounted to said feed device body so that one end of the escape bar abuts on the locking arm;

a collar installed at said one end of the escape bar abutting on the locking arm;

a third spring means interposed between the collar and the bracket and biasing said collar and escape bar toward said locking arm, the spring force of said third spring means being set larger than the attractive force of said second spring means; and a stopper fixed to said escape bar on a side of said bracket opposite from said third spring means and abutting a surface of the bracket to limit biasing movement of said collar at the midpoint of forward movement of the feed rod.

4. A device for feeding a welding bolt as set forth in claim 1, said bolt grasping section comprising:

a pair of symmetrical bolt grasping bodies having bolt receptacles in an upper surface thereof;

two rotary pins fixed to a plate-shaped extending portion projecting from an upper surface ;of said feed rod, each of said respective rotary pins pivotally mounting an intermediate portion of one of said bolt grasping bodies; and a first spring means interposed between ends of said bolt grasping bodies opposite from said bolt receptacles for rotating the bolt grasping bodies so that both bolt grasping bodies pivot about the rotary pins and the bolt receptacles face and abut each other, said inserting device comprising:

a holding arm having an inserting cylinder mounted to an upper surface thereof;

a fixing shaft projecting upward from a plate extending forward from an upper surface of said feed rod for pivotally supporting a center portion of the holding arm;

a locking arm projected from the holding arm;

a second spring means with one end fixed to the locking arm and another end fixed to the plate respectively;

an escape bar slidably supported by a bracket mounted to said feed device body so that one end of the escape bar abuts on the locking arm;

a collar installed at said one end of the escape bar abutting on the locking arm;

a third spring means interposed between the collar and the bracket and biasing said collar and escape bar toward said locking arm, the spring force of said third spring means being set larger than the attractive force of said second spring means; and a stopper fixed to said escape bar on a side of said bracket opposite from said third spring means and abutting a surface of the bracket to limit biasing movement of said collar at the midpoint of forward movement of the feed rod.

* * * * *